(12) United States Patent
Mahurin et al.

(10) Patent No.: US 11,561,792 B2
(45) Date of Patent: Jan. 24, 2023

(54) SYSTEM, APPARATUS, AND METHOD FOR A TRANSIENT LOAD INSTRUCTION WITHIN A VLIW OPERATION

(71) Applicant: QUALCOMM Incorporated, San Diego, CA (US)

(72) Inventors: Eric Mahurin, Austin, TX (US); Jakub Pawel Golab, Austin, TX (US)

(73) Assignee: Qualcomm Incorporated, San Diego, CA (US)

( * ) Notice: Subject to any disclaimer, the term of this patent is extended or adjusted under 35 U.S.C. 154(b) by 867 days.

(21) Appl. No.: 14/732,784

(22) Filed: Jun. 8, 2015

(65) Prior Publication Data

US 2016/0357558 A1 Dec. 8, 2016

(51) Int. Cl.
*G06F 9/30* (2018.01)
*G06F 9/38* (2018.01)
*G06F 1/10* (2006.01)

(52) U.S. Cl.
CPC .......... *G06F 9/30043* (2013.01); *G06F 1/10* (2013.01); *G06F 9/383* (2013.01); *G06F 9/3824* (2013.01); *G06F 9/3826* (2013.01); *G06F 9/3853* (2013.01)

(58) Field of Classification Search
CPC .................... G06F 9/30043; G06F 9/3853
See application file for complete search history.

(56) References Cited

U.S. PATENT DOCUMENTS 5,555,432 A * 9/1996 Hinton ............... G06F 9/30145
712/216
5,557,763 A 9/1996 Senter et al.
5,813,037 A * 9/1998 Martell ............... G06F 9/30141
711/147
6,026,479 A * 2/2000 Fisher ............... G06F 9/30076
712/215
6,862,677 B1 * 3/2005 Stravers ............... G06F 9/3826
712/218

(Continued)

FOREIGN PATENT DOCUMENTS

CN 101776989 A 7/2010
CN 102141905 A 8/2011

(Continued)

OTHER PUBLICATIONS

Shen, John Paul, Lipasti, Mikko. "Modern Processor Design: Fundamentals of Superscalar Processors" McGraw Hill, pp. 110-112 and 125-127. (Year: 2005).*

(Continued)

*Primary Examiner* — Jacob Petranek

(74) *Attorney, Agent, or Firm* — Muncy, Geissler, Olds & Lowe, P.C.

(57) ABSTRACT

A transient load instruction for a processor may include a transient or temporary load instruction that is executed in parallel with a plurality of input operands. The temporary load instruction loads a memory value into a temporary location for use within the instruction packet. According to some examples, a VLIW based microprocessor architecture may include a temporary cache for use in writing/reading a temporary memory value during a single VLIW packet cycle. The temporary cache is different from the normal register bank that does not allow writing and then reading the value just written during the same VLIW packet cycle.

35 Claims, 5 Drawing Sheets

(56) References Cited

U.S. PATENT DOCUMENTS

| | | | |
|---|---|---|---|
| 7,484,075 B2 | 1/2009 | Kailas | |
| 8,132,163 B2 | 3/2012 | Tal et al. | |
| 8,141,062 B2 | 3/2012 | Baev et al. | |
| 8,516,465 B2 | 8/2013 | Damron | |
| 2002/0124155 A1 | 9/2002 | Sami et al. | |
| 2002/0169942 A1* | 11/2002 | Sugimoto | G06F 9/3853 712/24 |
| 2004/0044881 A1* | 3/2004 | Maier | G06F 9/3824 712/218 |
| 2004/0226005 A1 | 11/2004 | Tarditi | |
| 2010/0199074 A1 | 8/2010 | Gemmeke et al. | |
| 2011/0035569 A1* | 2/2011 | Col | G06F 9/3001 712/23 |
| 2013/0332704 A1 | 12/2013 | Guerrero | |
| 2015/0277916 A1* | 10/2015 | Khartikov | G06F 9/30145 712/205 |
| 2015/0309796 A1* | 10/2015 | Wilson | G06F 9/3012 712/217 |

FOREIGN PATENT DOCUMENTS

| | | |
|---|---|---|
| CN | 103488464 A | 1/2014 |
| EP | 1050800 A1 | 11/2000 |
| EP | 1199629 A1 | 4/2002 |
| JP | H1165844 A | 3/1999 |
| JP | 2003523573 A | 8/2003 |
| JP | 2006285990 A | 10/2006 |
| JP | 2008015589 A | 1/2008 |

OTHER PUBLICATIONS

Hennessy, John L., Patterson, David A. "Computer Organization and Design: The Hardware Software Interface" 3rd edition, sections 7.2-7.3. (Year: 2005).*

Hennessy, John L., Patterson, David A. "Computer Architecture A Quantitative Approach" 3rd Edition, sections 5.13. (Year: 2003).*

International Search Report and Written Opinion—PCT/US2016/032863—ISA/EPO—dated Jul. 26, 2016.

Nakada T., et al., "An Instruction Scheduling Method with VLIW instruction Queue for Superscalar Processors", Transactions of Information Processing Society of Japan, Computing System, Information Processing Society of Japan, Nov. 15, 2009, pp. 48-62.

Shiba K., "Multi-path Speculative Execution Model with Program-counter Queues", Technical Reports of Information Processing Society of Japan, Information Processing Society of Japan, Aug. 5, 2000, vol. 2000, No. 74, (2000-ARC-139), pp. 175-180.

* cited by examiner

110 {
```
{
111— V1.tmp = VMEM(R0)        // V1 is the temporary load
112— V3:2   = VADD(V1:0, V5:4)
113— V13:12 = VDMPY(V1:0, R5)
}
```
}

120 {
```
{
121— V2.tmp = VMEM(R0)        // V2 is the temporary load
122— V20    = VADD(V2, V2)
123— V5     = VALIGN(V10, V2, R7)
124— V13:12 = VDMPY(V3:2, R5)
}
```
}

130 {
```
{
131— V3.tmp = VMEM(R0)        // V3 is the temporary load
132— VMEM(R1) = V3
}
```
}

FIG. 1

SYSTEM, APPARATUS, AND METHOD FOR A TRANSIENT LOAD INSTRUCTION WITHIN A VLIW OPERATION

FIELD OF DISCLOSURE

This disclosure relates generally to memory load operations, and more specifically to a temporary load vector operation for very long instruction word (VLIW) based systems.

BACKGROUND

In computing, an optimizing compiler is a compiler that tries to minimize or maximize some attributes of an executable computer program. The most common requirement is to minimize the time taken to execute a program; a less common one is to minimize the amount of memory occupied. The growth of portable computers has created a market for minimizing the power consumed by a program. Compiler optimization is generally implemented using a sequence of optimizing transformations, algorithms which take a program and transform it to produce a semantically equivalent output program that uses fewer resources. In the past, computer memory limitations were also a major factor in limiting which optimizations could be performed. Because of all these factors, optimization rarely produces "optimal" output, but rather employs heuristic methods for improving resource usage in typical programs.

In compiler optimization, register allocation is the process of assigning a large number of target program variables onto a small number of CPU registers. Register allocation can happen over a basic block (local register allocation), over a whole function/procedure (global register allocation), or across function boundaries traversed via call-graph (interprocedural register allocation). When done per function/procedure the calling convention may require insertion of save/restore around each call-site. In many programming languages, the programmer has the illusion of allocating arbitrarily many variables. However, during compilation, the compiler must decide how to allocate these variables to a small, finite set of registers. Not all variables are in use (or "live") at the same time, so some registers may be assigned to more than one variable. However, two variables in use at the same time cannot be assigned to the same register without corrupting its value. Variables which cannot be assigned to some register must be kept in RAM and loaded in/out for every read/write, a process called spilling. Accessing RAM is significantly slower than accessing registers and slows down the execution speed of the compiled program, so an optimizing compiler aims to assign as many variables to registers as possible. Register pressure is the term used when there are fewer hardware registers available than would have been optimal; higher pressure usually means that more spills and reloads are needed.

When data is loaded from memory, only needed for one operation and then discarded, this can lead to register pressure (especially when unrolling inner loops) and difficulty in scheduling the load and possibly hiding the "load to use" latency. Thus, conventional systems suffer from register pressure and minimizing the impact of data that is very transient in nature (only needs to exist for 1 cycle/1 packet). Loading and then using the data causes a problem of latency of the write to the register followed by the use as well as the use of a register for what is effectively a temporary value.

Accordingly, there are long-felt industry needs for methods that improve upon conventional methods including the improved methods and apparatus provided hereby.

The inventive features that are characteristic of the teachings, together with further features and advantages, are better understood from the detailed description and the accompanying figures. Each of the figures is provided for the purpose of illustration and description only, and does not limit the present teachings.

SUMMARY

The following presents a simplified summary relating to one or more aspects and/or examples associated with the apparatus and methods disclosed herein. As such, the summary should not be considered an extensive overview relating to all contemplated aspects and/or examples, nor should the following summary be regarded to identify key or critical elements relating to all contemplated aspects and/or examples or to delineate the scope associated with any particular aspect and/or example. Accordingly, the following summary has the sole purpose to present certain concepts relating to one or more aspects and/or examples relating to the apparatus and methods disclosed herein in a simplified form to precede the detailed description presented below.

Some examples of the disclosure are directed to systems, apparatus, and methods for reducing register pressure by getting a "free" temporary register that can be used immediately within the current packet, like a dedicated "load-op", but without needing additional instructions that operate on memory.

In one aspect, an apparatus includes a memory storing a transient load instruction, a second instruction, and load data; an instruction register configured to store the transient load instruction and the second instruction; a processor coupled to the memory and the instruction register; the processor configured to: retrieve the transient load instruction from the memory; store the transient load instruction in the instruction register; retrieve the load data from the memory in response to the transient load instruction; store the load data in the instruction register in response to the transient load instruction; and execute the second instruction using the load data.

In another aspect, a method for executing a memory load operation by a processor includes retrieving a transient load instruction from a memory; storing the transient load instruction in an instruction register; retrieving load data from the memory in response to the transient load instruction; storing the load data in the instruction register in response to the transient load instruction; and executing a second instruction using the load data.

In still another aspect, a computer program product residing on a processor-executable computer storage medium, the computer program product comprising processor-executable instructions configured to cause a processor to: retrieve a transient load instruction from a memory; store the transient load instruction in an instruction register; retrieve load data from the memory in response to the transient load instruction; store the load data in the instruction register in response to the transient load instruction; and execute a second instruction using the load data.

In still another aspect, an apparatus includes first means for storing a transient load instruction, a second instruction, and load data; second means for storing the transient load instruction and the second instruction; means for processing data coupled to the first means for storing and the second means for storing; the means for processing data configured to: retrieve the transient load instruction from the first means for storing; store the transient load instruction in the second means for storing; retrieve the load data from the first means for storing in response to the transient load instruction; store the load data in the second means for storing in response to the transient load instruction; and execute the second instruction using the load data.

Other features and advantages associated with the apparatus and methods disclosed herein will be apparent to those skilled in the art based on the accompanying drawings and detailed description.

BRIEF DESCRIPTION OF THE DRAWINGS

The accompanying drawings are presented to describe examples of the present teachings, and are not limiting. The accompanying drawings are presented to aid in the description of examples of the disclosure and are provided solely for illustration of the examples and not limitation thereof.

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which:

FIG. 1 illustrates an exemplary load instruction packet in accordance with some examples of the disclosure.

Figure 2:
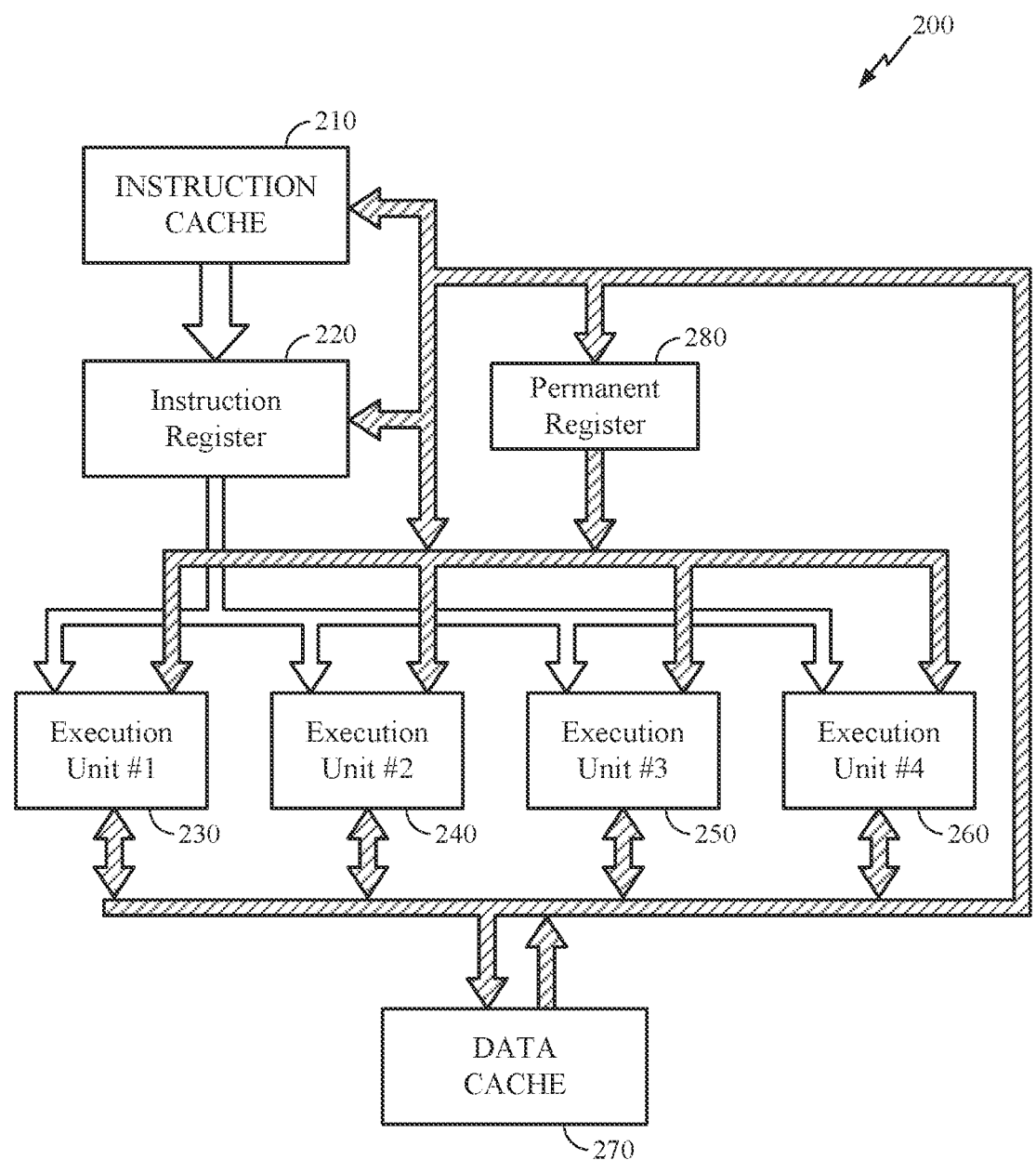
FIG. 2 illustrates an exemplary VLIW processor architecture including components operable to perform a memory load operation in accordance with some examples of the disclosure.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

Various aspects are disclosed in the following description and related drawings to show specific examples relating to the disclosure. Alternate examples will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and examples disclosed herein.

High performance processors according to some examples of the disclosure rely on superscalar and/or transient load instruction (such as very long instruction word (VLIW)) techniques for exploiting instruction level parallelism in programs; that is, for executing more than one instruction/input operands at a time. These processors, such as processor 200 (see FIG. 4), contain multiple functional units, execute a sequential stream of instructions/input operands, are able to fetch two or more instructions/input operands per clock cycle from memory, and are able to dispatch two or more instructions/input operands per clock cycle subject to dependencies and availability of resources. These capabilities are exploited by compilers which generate code that is optimized for superscalar and/or transient load instruction features, such as VLIW features.

In sequential programs, a memory load operation reads a datum from memory, loads it in a processor register, and frequently starts a sequence of operations that depend on the datum loaded. In a superscalar or VLIW processor in which there are resources available, it is advantageous to initiate memory load operations as early as possible because that may lead to the use of otherwise idle resources and may hide delays in accessing memory (including potential cache misses), thus reducing the execution time of programs. The load, as well as the operations that depend on the load, are executed earlier than what they would have been in a strictly sequential program, achieving a shorter execution time. This requires the ability to perform non-blocking loads (i.e., continue issuing instructions beyond a load which produces a cache miss), the ability to issue loads ahead of preceding stores (i.e., out-of-order loads), the ability to move loads ahead of preceding branches (i.e., speculation), and the ability to move operations that depend on a load ahead of other operations.

An example processor may include a register state consisting of 64 32-bit general purpose registers, 8 single-bit condition code registers, 4 memory address registers, program status word register, and some special registers. Each Very Long Instruction Word is 759 bits, which include:
  eight ALU operations
  four loads or stores (the sum of ALU operations and loads must not exceed 8).
  seven conditional branches (seven test nodes in a tree, producing an eight-way branch); and
  a binary encoding of the tree-instruction.

Register to register operations (arithmetic, logical, shifting) are RISC-like, whereas load/store operations use memory address registers (MAR) as base registers. For each tree-path, the following information is provided in the long instruction:
  a mask indicating which condition codes must be true, which condition codes must be false, and which are don't care, in order for the path to be taken;
  the address of the target instruction for the path; and
  a mask indicating which subset of ALU/memory operations should be committed, if the path is taken (that is, the set of operations on the path).

A typical VLIW may include up to 4 instructions in a packet and looks as follows but it should be understood that is may include more or less than 4 per packet:

---

Packet N: { V0 = VMEM(R0); }
// Memory load from address R0 into register V0
// Some latency between load and use of V0
Packet N+1: { V2 = VADD(V0, V1); V3 = VSUB(V0,V1);}
// Use of V0

---

Typical Load-Op requires a dedicated load-op instruction that has a unique instruction encoding and may also have a restriction on which operand can come from memory:

1. Destination Register=Operation(Source Register0, Source Register1)
2. Destination Register=Operation(Source Register0, [Memory Address])
3. Destination Register=Operation([Memory Address], Source Register0)

A Load-Op in VLIW would require support for multiple memory accesses in one packet:

---

Packet N+1: { V2 = VADD(V0, [R0]); V3 = VSUB(V0,[R1]);}
// This would be difficult to support as the two memory accesses could be to different locations.

---

In some examples of the disclosure, a temporary load instruction may hide the latency. The temporary load instruction may hide the latency of the load through the load-op pipeline and VFIFO so this allows for immediate use of the load value with the packet:

Packet N: {V0.tmp=VMEM(R0); V2=VADD(V0, V1); V3=VSUB(V0,V1);}
Packet N+1: {V12.tmp=VMEM(R0); V2=VADD(V12, V1); V3=VMPY(V12,V12);}

In the above packets, the memory content at R0 is loaded into a temporary buffer. The temporary load instruction indicates the register to replace in the instructions within that packet. This alleviates the need of providing dedicated load-op instructions as any instruction's operand can come from memory. Effectively any instruction can be a load-op without needing a dedicated encoding. The temporary register can be forward to multiple instructions within the packet so multiple instructions can act like a load-op within a packet. The temporary value is never written to the register file so a register file write port is not consumed.

FIG. 1 illustrates an exemplary load instruction packet according to some examples of the disclosure. As shown in FIG. 1, a new instruction, Vd.tmp, is set to equal a specific memory address (Vd.tmp=VMEM(#address)) by a compiler. The Vd.tmp destination replaces all vector sources in all instructions of the current packet.

As shown, FIG. 1 illustrates a first vector instruction packet 110, a second VLIW instruction packet 120, and a third instruction packet 130. The first instruction packet 110 may include a first vector instruction 111 (transient load vector instruction), a second vector instruction 112, and a third vector instruction 113. The first vector instruction 111 is a temporary or transient load vector instruction that sets or defines V1.tmp (transient load) equal to a current value of the R0 memory location. This temporary or transient value can then be used by the subsequent vector instructions in the same packet without consuming a write port. As can be seen, the second vector instruction 112 uses two of the four write ports available to write the VADD values while the third vector instruction 113 uses the other two write ports to write the VDMPY values. By providing the transient load vector instruction, the system avoids using a write port for a memory load operation. Thus, a transient load instruction differs from a conventional load instruction in that a transient load instruction does not require the processor to access a memory location for the load data and then write the load data to a register. This obviates the need to consume a write port of the register to perform a load operation during execution of a VLIW instruction packet.

The second instruction packet 120 may include a first instruction 121, a second instruction 122, a third instruction 123, and a fourth instruction 124. The first instruction 121 is a temporary load instruction that sets V2.tmp equal to a current value of the R0 memory location. This temporary value can then be used by the subsequent instructions in the same packet without consuming a write port (this is why we might not recycle V1.tmp). As can be seen, the second instruction 122 uses one of the four write ports available to write the VADD values. The third instruction 123 uses another write port to write the VALIGN values. The fourth instruction 124 uses the two remaining write ports to write the VDMPY values.

The third instruction packet 130 may include a first instruction 131 and a second instruction 132. The first instruction 131 is a temporary load instruction that sets V3.tmp equal to a current value of the R0 memory location. This temporary value can then be used by the subsequent instructions in the same packet without consuming a write port (this is why we might not recycle V1.tmp or V2.tmp even though they all use the same memory location/data). As can be seen, the second instruction 132 uses one of the four write ports available to write the VMEM value.

For example:

---

{ V1.tmp = VMEM(R0)         // V1 is the temporary load
V3:2 = VADD(V1:0, V5:4)
V13:12 = VDMPY(V1:0, R5)
}
{ V2.tmp = VMEM(R0)         // V2 is the temporary load
V20 = VADD(V2, V2)
V5 = VALIGN(V10, V2, R7)
V13:12 = VDMPY(V3:2, R5)
}
{ V3.tmp = VMEM(R0)         // V3 is the temporary load
VMEM(R1) = V3
}

---

Some examples of the disclosure help reduce register pressure by getting a "free" temporary register that can be used immediately within the current packet, like a dedicated "load-op", but without needing additional instructions that operate on memory. The temporary load enables any vector instruction to become a memory-op and any vector source operand can be a memory source (no need for dedicated load-op instructions). Because the temporary load instruction does not write to the register file, register pressure is reduced, and no register file port is consumed by the load operation. By placing the temporary load instruction at the beginning of the packet, the latency to access memory/register data is hidden as well.

FIG. 2 illustrates an exemplary VLIW processor architecture for performing a memory load operation in accordance with some examples of the disclosure. As shown in FIG. 2, a VLIW based processor or microprocessor system 200 may include an instruction cache 210 for storing VLIW based instruction packets, an instruction or temporary register 220 for temporarily storing VLIW instruction packets while a compiler (not shown) replaces load instructions with temporary load instructions as required, a first execution unit 230 for performing logic operations based on the VLIW instructions, a second execution unit 240 for performing logic operations based on the VLIW instructions, a third execution unit 250 for performing logic operations based on the VLIW instructions, a fourth execution unit 260 for performing logic operations based on the VLIW instructions, a data cache 270 for storing data, and a permanent register 280 for storing data to be used by the execution units 230-260. The four execution units 230-260 may comprise a processor. While four execution units and one register file are shown, it should be understood that more or less may be used based on the architecture requirements. With four execution units, each execution unit may completely process one of the four possible instructions in each multiple instruction packet (VLIW). While VLIW and vector based processors are discussed throughout, it should be understood that the inventive concepts disclosed herein may be applied to non-vector processors as well non-vector instructions implemented by a vector processor.

In a conventional load operation, a plurality of instruction packets (e.g. packets 110-130) are retrieved from the instruction cache 210 and sequentially cycled through the instruction register 220. Once the conventional instruction packet gets to the top of the instruction register 220, the system 200 sends that instruction packet to one of the execution units 230-260 for execution. If the instruction packet is a conventional load instruction, the execution unit that processes the instruction packet will retrieve the requested load data from the data cache 270 and then use one of the two read or write ports of the register file 280 to write the load data into the register file for subsequent use by the execution units 230-260. This may create register pressure if other execution units are also trying to access the register file 280 through the two read/write ports. If, however, the instruction packet is a transient load instruction (e.g. the first instruction packet 111) according to some examples herein, the execution unit that processes the transient load instruction will retrieve the load data from the data cache 270 and then write the load data into the instruction register 220 for use by subsequent instruction packets that require the load data. Thus, the transient load instruction may be processed without updating (reading or writing) the register file 280 and without tying up one of its two read/write ports.

Figure 3:
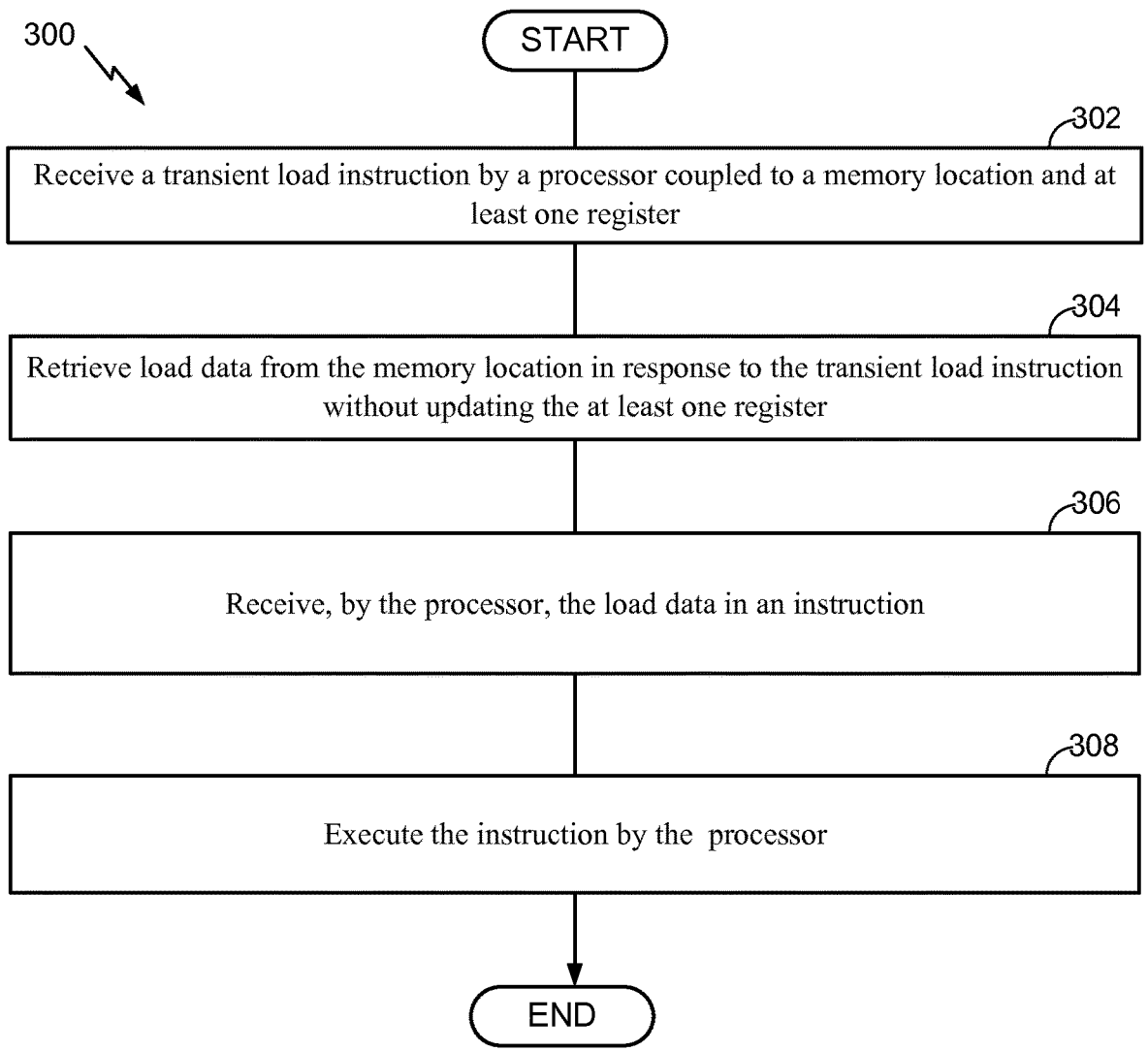
FIG. 3 illustrates an exemplary flow diagram of a method for a memory load operation in accordance with some examples of the disclosure.

FIG. 3 is a flow diagram illustrating an example method for a memory load operation in accordance with the techniques described above. The method 300 may be performed, for example, a microprocessor system 200 (See FIGS. 2 and 4). As shown in block 302, the system 300 may receive a transient load instruction at a processor (such as any one or all of execution units 230-260) coupled to a memory location (such as instruction cache 210) and at least one register (such as register 280). As shown next in block 304, the system 300 may retrieve load data from the memory location (such as instruction cache 210) in response to the transient load instruction without updating the at least one register (such as without storing the load data in register 280 described in the previous paragraph). For example, execution unit 230 may receive a transient load instruction from the instruction cache 210 and, in response to the transient load instruction, retrieve load data from the instruction cache 210. Unlike a conventional system, the execution unit 230 does not store the load data in the register 280 but may store the load data in a temporary location such as instruction cache 210, instruction register 220, or any of execution units 230-260. As shown next in block 306, the system 300 may receive the load data in another instruction at the execution unit 230 (alternatively, another execution unit, such as execution unit 240, may receive the instruction with the load data). As shown next in block 308, the execution unit 230 may execute the instruction utilizing the load data received in the instruction. This avoids the use of the limited read/write ports of the register 280 to store and then subsequent load data for use in the instruction packet. Executing the instruction may be performed by a very long instruction word type processor and the transient load instruction and the instruction may be a very long instruction word packet. The instruction may be a plurality of instructions and at least one of the plurality of instructions receives the load data. For example, at least one of the plurality of instructions receiving the load data may be a memory write instruction that enables reading and writing to a second memory location within one packet cycle. Additionally, blocks 302-308 may occur in one cycle or in multiple cycles. For example, receiving the transient load instruction may occur first in a multiple instruction packet with the instruction containing the load data being later in the multiple instruction packet.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Long Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), 802.11 provided by the Institute of Electrical and Electronics Engineers (IEEE), etc.

In cellular networks, "macro cell" access points provide connectivity and coverage to a large number of users over a certain geographical area. A macro network deployment is carefully planned, designed, and implemented to offer good coverage over the geographical region. To improve indoor or other specific geographic coverage, such as for residential homes and office buildings, additional "small cell," typically low-power access points have recently begun to be deployed to supplement conventional macro networks. Small cell access points may also provide incremental capacity growth, richer user experience, and so on.

Recently, small cell LTE operations, for example, have been extended into the unlicensed frequency spectrum such as the Unlicensed National Information Infrastructure (U-NII) band used by Wireless Local Area Network (WLAN) technologies. This extension of small cell LTE operation is designed to increase spectral efficiency and hence capacity of the LTE system. However, it may also encroach on the operations of other Radio Access Technologies (RATs) that typically utilize the same unlicensed bands, most notably IEEE 802.11x WLAN technologies generally referred to as "Wi-Fi." These wireless technologies may be embodied in a wireless device such as wireless device 400 and, as described below, the wireless device 400 may include aspects of the memory load operation and associated apparatus described herein.

Figure 4:
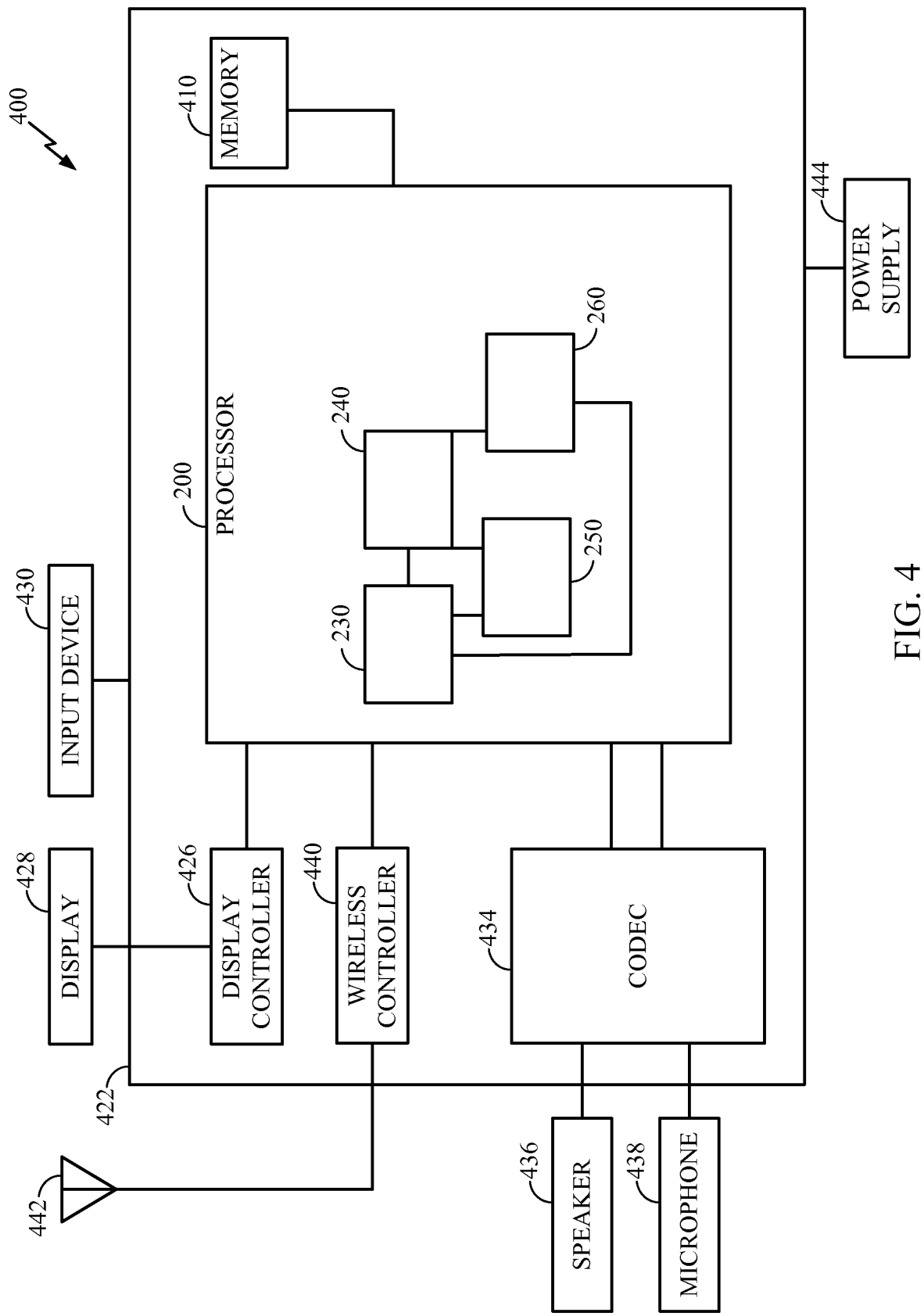
FIG. 4 is an exemplary block diagram of a wireless device including components operable to perform a memory load operation in accordance with some examples of the disclosure.

Referring now to FIG. 4, a block diagram of a wireless device including components operable to perform a memory load operation is depicted and generally designated 400. Wireless device 400 includes processor 200 of FIG. 2, comprising a first execution unit 230, a second execution unit 240, a third execution unit 250, and a fourth execution unit 260 as discussed above. Processor 200 may be communicatively to memory 410. An instruction cache is not explicitly shown in this view but may be part of processor 200 or may be a separate block coupled between processor 200 and memory 410 as known in the art. Wireless device 400 may be configured to perform the method of FIG. 3, and may further be configured to execute instructions retrieved from memory 410 in order to perform the method of FIG. 3 in some aspects.

FIG. 4 also shows display controller 426 that is coupled to processor 200 and to display 428. Coder/decoder (CO-DEC) 434 (e.g., an audio and/or voice CODEC) can be coupled to processor 200. Other components, such as wireless controller 440 (which may include a modem) are also illustrated. Speaker 436 and microphone 438 can be coupled to CODEC 434. FIG. 4 also indicates that wireless controller 440 can be coupled to wireless antenna 442. In a particular aspect, processor 200, display controller 426, memory 410, CODEC 434, and wireless controller 440 are included in a system-in-package or system-on-chip device 422.

In a particular aspect, input device 430 and power supply 444 are coupled to the system-on-chip device 422. Moreover, in a particular aspect, as illustrated in FIG. 4, display 428, input device 430, speaker 436, microphone 438, wireless antenna 442, and power supply 444 are external to the system-on-chip device 422. However, each of display 428, input device 430, speaker 436, microphone 438, wireless antenna 442, and power supply 444 can be coupled to a component of the system-on-chip device 422, such as an interface or a controller.

It should be noted that although FIG. 4 depicts a wireless communications device, processor 200 and memory 410 may also be integrated into a device selected from a group comprising of a music player, a video player, an entertainment unit, a navigation device, a communications device, a mobile device, a mobile phone, a smartphone, a personal digital assistant, a fixed location terminal, a tablet computer, a computer, a wearable device, a laptop computer, a server, and a device in an automotive vehicle, or other similar devices.

Figure 5:
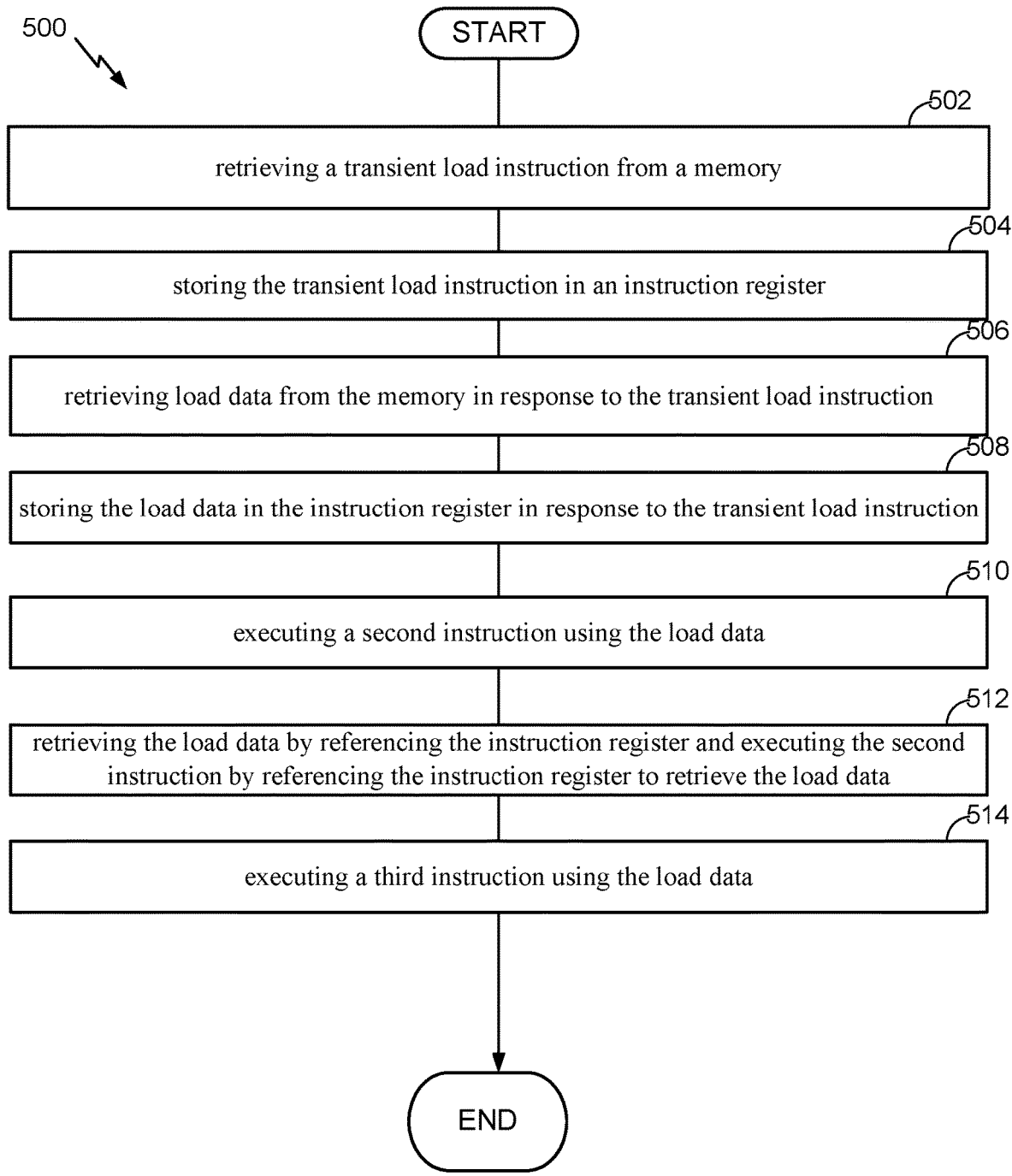
FIG. 5 is an exemplary partial method of a memory load operation in accordance with some examples of the disclosure.

It should furthermore be noted that methods disclosed in the description or in the claims can be implemented by a device comprising means for performing the respective steps or actions of this method. For example, an apparatus may include first means for storing a transient load instruction, a second instruction, and load data (e.g. instruction cache 210); second means for storing the transient load instruction and the second instruction (e.g. instruction register 220); means for processing data coupled to the first means for storing and the second means for storing; the means for processing data configured to: retrieve the transient load instruction from the first means for storing; store the transient load instruction in the second means for storing; retrieve the load data from the first means for storing in response to the transient load instruction; store the load data in the second means for storing in response to the transient load instruction; and execute the second instruction using the load data FIG. 5 is an exemplary partial method a memory load operation in accordance with some examples of the disclosure. The partial method 500 may be performed, for example, by a microprocessor system 200 (See FIGS. 2 and 4) for executing a memory load operation by a processor (such as any one or all of execution units 230-260). The partial method begins in block 502 with retrieving a transient load instruction from a memory (such as instruction cache 210). The partial method continues in block 504 with storing the transient load instruction in an instruction register (such as register 280). The partial method continues in block 506 with retrieving load data from the memory in response to the transient load instruction. The partial method continues in block 508 with storing the load data in the instruction register in response to the transient load instruction. The partial method may end in block 510 with executing a second instruction using the load data. Alternatively, the partial method may continue in blocks 512-514 with one or more of: retrieving the load data by referencing the instruction register and executing the second instruction by referencing the instruction register to retrieve the load data (512); and executing a third instruction using the load data (514). Furthermore, the partial method 500 may include the following options: storing the load data in the instruction register and executing the second instruction are performed by a very long instruction word type processor, and the transient load instruction and the second instruction are a very long instruction word packet; the transient load instruction is a first instruction in a multiple instruction packet; the third instruction is a memory write instruction that enables reading and writing to a second memory in one clock cycle; retrieving the transient load instruction, retrieving the load data, and executing the second instruction occur in one clock cycle; and retrieving the transient load instruction, retrieving the load data, and executing the second instruction occur in multiple clock cycles.

The word "exemplary" is used herein to mean "serving as an example, instance, or illustration." Any details described herein as "exemplary" is not necessarily to be construed as preferred or advantageous over other examples. Likewise, the term "examples" does not require that all examples include the discussed feature, advantage or mode of operation. Use of the terms "in one example," "an example," "in one feature," and/or "a feature" in this specification does not necessarily refer to the same feature and/or example. Furthermore, a particular feature and/or structure can be combined with one or more other features and/or structures. Moreover, at least a portion of the apparatus described hereby can be configured to perform at least a portion of a method described hereby.

The terminology used herein is for the purpose of describing particular examples only and is not intended to be limiting of examples of the disclosure. As used herein, the singular forms "a," "an," and "the" are intended to include the plural forms as well, unless the context clearly indicates otherwise. It will be further understood that the terms "comprises", "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should be noted that the terms "connected," "coupled," or any variant thereof, mean any connection or coupling, either direct or indirect, between elements, and can encompass a presence of an intermediate element between two elements that are "connected" or "coupled" together via the intermediate element. Coupling and/or connection between the elements can be physical, logical, or a combination thereof. As employed herein, elements can be "connected" or "coupled" together, for example, by using one or more wires, cables, and/or printed electrical connections. These are several non-limiting and non-exhaustive examples.

Any reference herein to an element using a designation such as "first," "second," and so forth does not limit the quantity and/or order of those elements. Rather, these designations are used as a convenient method of distinguishing between two or more elements and/or instances of an element. Thus, a reference to first and second elements does not mean that only two elements can be employed, or that the first element must necessarily precede the second element. Also, unless stated otherwise, a set of elements can comprise one or more elements. In addition, terminology of the form "at least one of: A, B, or C" used in the description or the claims can be interpreted as "A or B or C or any combination of these elements."

Further, many examples are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the examples described herein, the corresponding form of any such examples may be described herein as, for example, "logic configured to" perform the described action.

Nothing stated or illustrated depicted in this application is intended to dedicate any component, step, feature, benefit, advantage, or equivalent to the public, regardless of whether the component, step, feature, benefit, advantage, or the equivalent is recited in the claims.

What is claimed is:

1. An apparatus, comprising:
    a first memory storing a transient load instruction, a second instruction, and a third instruction;
    a second memory storing load data;
    an instruction register;
    a processor coupled to the first memory, the second memory, and the instruction register;
    the processor configured to:
    retrieve, from the first memory, a multiple instruction packet comprising a plurality of instructions, the plurality of instructions comprising the transient load instruction and at least the second instruction and the third instruction, wherein the transient load instruction is configured to replace a vector source of the transient load instruction in at least the second instruction and the third instruction with the load data;
    store the transient load instruction in the instruction register;
    retrieve the load data from the second memory in response to the transient load instruction;
    store the load data in the instruction register in response to the transient load instruction; and
    execute at least the second instruction and the third instruction using the load data stored in the instruction register.

2. The apparatus of claim 1, wherein the processor is further configured to retrieve the load data by referencing the instruction register and to execute at least the second instruction and the third instruction by referencing the instruction register to retrieve the load data without accessing a processor register or storing the load data in the processor register.

3. The apparatus of claim 1, wherein the processor is a very long instruction word processor configured to process a very long instruction word packet that includes the transient load instruction, the second instruction, and the third instruction.

4. The apparatus of claim 1, wherein the processor is further configured to retrieve a second multiple instruction packet comprising a second transient load instruction, a fourth instruction, a fifth instruction, and a sixth instruction wherein the fourth instruction, the fifth instruction, and the sixth instruction are configured to use a value indicated by the second transient load instruction.

5. The apparatus of claim 1, wherein the processor is further configured to retrieve a third multiple instruction packet comprising a third transient load instruction and a seventh instruction wherein the processor is configured to execute the seventh instruction using the load data.

6. The apparatus of claim 5, wherein the seventh instruction is a memory write instruction that enables reading and writing to a second memory.

7. The apparatus of claim 1, wherein the processor is further configured to retrieve the transient load instruction in one clock cycle, retrieve the load data in one clock cycle, and execute the second instruction in one clock cycle.

8. The apparatus of claim 1, wherein the processor is further configured to retrieve the transient load instruction, retrieve the load data, and execute the second instruction in multiple clock cycles.

9. The apparatus of claim 1, wherein the apparatus is incorporated into a device selected from a group comprising of a music player, a video player, an entertainment unit, a navigation device, a communications device, a mobile device, a mobile phone, a smartphone, a personal digital assistant, a fixed location terminal, a tablet computer, a computer, a wearable device, a laptop computer, a server, and a device in an automotive vehicle, and further including the device.

10. A method for executing a memory load operation by a processor, the method comprising:
    retrieving, from a first memory, a multiple instruction packet comprising a plurality of instructions, the plurality of instructions comprising a transient load instruction and at least a second instruction and a third instruction, wherein the transient load instruction is configured to replace a vector source of the transient load instruction in at least the second instruction and the third instruction with load data;
    storing the transient load instruction in an instruction register;
    retrieving the load data from a second memory in response to the transient load instruction;
    storing the load data in the instruction register in response to the transient load instruction; and
    executing at least the second instruction and the third instruction using the load data stored in the instruction register.

11. The method of claim 10, further comprising retrieving the load data by referencing the instruction register and executing at least the second instruction and the third instruction by referencing the instruction register to retrieve the load data without accessing a processor register or storing the load data in the processor register.

12. The method of claim 10, wherein storing the load data in the instruction register and executing the second instruction are performed by a very long instruction word type processor, and the transient load instruction, the second instruction, and the third instruction are a very long instruction word packet.

13. The method of claim 10, further comprising retrieving a second multiple instruction packet comprising a second transient load instruction, a fourth instruction, a fifth instruction, and a sixth instruction wherein the fourth instruction, the fifth instruction, and the sixth instruction are configured to use a value indicated by the second transient load instruction.

14. The method of claim 10, further comprising retrieving a third multiple instruction packet comprising a third transient load instruction and a seventh instruction and executing the seventh instruction using the load data.

15. The method of claim 14, wherein the seventh instruction is a memory write instruction that enables reading and writing to a second memory.

16. The method of claim 10, wherein retrieving the transient load instruction occurs in one clock cycle, retrieving the load data occurs in one clock cycle, and executing the second instruction occurs in one clock cycle.

17. The method of claim 10, wherein each of retrieving the transient load instruction, retrieving the load data, and executing the second instruction occur in multiple clock cycles.

18. The method of claim 10, wherein executing the second instruction is performed by a processor that is incorporated into a device selected from a group consisting of a music player, a video player, an entertainment unit, a navigation device, a communications device, a mobile device, a mobile phone, a smartphone, a personal digital assistant, a fixed location terminal, a tablet computer, a computer, a wearable device, a laptop computer, a server, and a device in an automotive vehicle, and further including the device.

19. A computer program product residing on a processor-executable non-transitory computer storage medium, the computer program product comprising processor-executable instructions configured to cause a processor to:
retrieve, from a first memory, a multiple instruction packet comprising a plurality of instructions, the plurality of instructions comprising a transient load instruction and at least a second instruction and a third instruction, wherein the transient load instruction is configured to replace a vector source of the transient load instruction in at least the second instruction and the third instruction with load data;
store the transient load instruction in an instruction register;
retrieve the load data from a second memory in response to the transient load instruction;
store the load data in the instruction register in response to the transient load instruction; and
execute at least the second instruction and the third instruction using the load data stored in the instruction register.

20. The computer program product of claim 19, wherein the processor is configured to retrieve the load data by referencing the instruction register and execute at least the second instruction and the third instruction by referencing the instruction register to retrieve the load data without accessing a processor register or storing the load data in the processor register.

21. The computer program product of claim 19, wherein the processor is a very long instruction word type processor, and the transient load instruction, the second instruction, and the third instruction are a very long instruction word packet.

22. The computer program product of claim 19, wherein the processor is further configured to retrieve a second multiple instruction packet comprising a second transient load instruction, a fourth instruction, a fifth instruction, and a sixth instruction wherein the fourth instruction, the fifth instruction, and the sixth instruction are configured to use a value indicated by the second transient load instruction.

23. The computer program product of claim 19, wherein the processor is further configured to retrieve a third multiple instruction packet comprising a third transient load instruction and a seventh instruction, and to execute the seventh instruction using the load data.

24. The computer program product of claim 23, wherein the seventh instruction is a memory write instruction that enables reading and writing to a second memory.

25. The computer program product of claim 19, wherein the processor is configured to retrieve the transient load instruction in one clock cycle, retrieve the load data in one clock cycle, and execute the second instruction in one clock cycle.

26. The computer program product of claim 19, wherein the processor is configured to retrieve the transient load instruction, retrieve the load data, and execute the second instruction occur in multiple clock cycles.

27. An apparatus comprising:
first means for storing a transient load instruction, a second instruction, and a third instruction;
second means for storing load data;
third means for storing the transient load instruction, the second instruction, and the third instruction;
means for processing data coupled to the first means for storing, the second means for storing, and the third means for storing;
the means for processing data configured to:
retrieve, from the first means for storing, a multiple instruction packet comprising a plurality of instructions, the plurality of instructions comprising the transient load instruction and at least the second instruction and the third instruction, wherein the transient load instruction is configured to replace a vector source of the transient load instruction in at least the second instruction and the third instruction with the load data;
store the transient load instruction in the third means for storing;
retrieve the load data from the second means for storing in response to the transient load instruction;
store the load data in the third means for storing in response to the transient load instruction; and
execute at least the second instruction and the third instruction using the load data stored in the third means for storing.

28. The apparatus of claim 27, wherein the means for processing data is further configured to retrieve the load data by referencing the third means for storing and execute at least the second instruction and the third instruction by referencing the third means for storing to retrieve the load data without accessing a processor register or storing the load data in the processor register.

29. The apparatus of claim 27, wherein the means for processing data is a very long instruction word processor configured to process a very long instruction word packet that includes the transient load instruction, the second instruction, and the third instruction.

30. The apparatus of claim 27, wherein the means for processing data is further configured to retrieve a second multiple instruction packet comprising a second transient load instruction, a fourth instruction, a fifth instruction, and a sixth instruction wherein the fourth instruction, the fifth instruction, and the sixth instruction are configured to use a value indicated by the second transient load instruction.

31. The apparatus of claim 27, wherein the means for processing data is further configured to retrieve a third multiple instruction packet comprising a third transient load instruction and a seventh instruction, wherein the means for processing data is configured to execute the seventh instruction using the load data.

32. The apparatus of claim 31, wherein the seventh instruction is a memory write instruction that enables reading and writing to a second memory.

33. The apparatus of claim 27, wherein the means for processing data is further configured to retrieve the transient load instruction in one clock cycle, retrieve the load data in one clock cycle, and execute the second instruction in one clock cycle.

34. The apparatus of claim 27, wherein the means for processing data is further configured to retrieve the transient load instruction, retrieve the load data, and execute the second instruction in multiple clock cycles.

35. The apparatus of claim 27, wherein the apparatus is incorporated into a device selected from a group consisting of a music player, a video player, an entertainment unit, a navigation device, a communications device, a mobile device, a mobile phone, a smartphone, a personal digital assistant, a fixed location terminal, a tablet computer, a computer, a wearable device, a laptop computer, a server, and a device in an automotive vehicle, and further including the device.

* * * * *